(12) United States Patent
Kelley

(10) Patent No.: US 7,974,370 B2
(45) Date of Patent: Jul. 5, 2011

(54) PARALLEL PROCESSING FOR SINGLE ANTENNA INTERFERENCE CANCELLATION

(75) Inventor: Brian T. Kelley, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 957 days.

(21) Appl. No.: 11/616,410

(22) Filed: Dec. 27, 2006

(65) Prior Publication Data

US 2008/0159452 A1    Jul. 3, 2008

(51) Int. Cl.
    H03D 1/04    (2006.01)
    H03D 1/06    (2006.01)
    H03K 5/01    (2006.01)
    H03K 6/04    (2006.01)
    H04B 1/10    (2006.01)
    H04L 1/00    (2006.01)
    H04L 25/08   (2006.01)
    H04B 15/00   (2006.01)

(52) U.S. Cl. ........ 375/346; 327/310; 327/384; 327/551; 348/607; 375/285; 375/316; 455/296

(58) Field of Classification Search .................. 375/285, 375/316, 346; 327/310, 384, 551; 348/607; 455/296
See application file for complete search history.

(56) References Cited

U.S. PATENT DOCUMENTS

| | | | | |
|---|---|---|---|---|
| 5,848,105 A | | 12/1998 | Gardner et al. | 375/336 |
| 6,400,928 B1 | * | 6/2002 | Khullar et al. | 455/67.11 |
| 6,574,648 B1 | * | 6/2003 | Oohashi et al. | 708/402 |
| 6,904,106 B2 | * | 6/2005 | Papasakellariou et al. | 375/341 |
| 7,065,055 B1 | * | 6/2006 | Karlsson et al. | 370/282 |
| 7,075,916 B2 | * | 7/2006 | Kim et al. | 370/342 |
| 2002/0057730 A1 | * | 5/2002 | Karlsson et al. | 375/152 |
| 2002/0075837 A1 | * | 6/2002 | Kim et al. | 370/342 |
| 2003/0012264 A1 | * | 1/2003 | Papasakellariou et al. | 375/148 |
| 2003/0028844 A1 | * | 2/2003 | Coombs | 714/796 |
| 2003/0076875 A1 | * | 4/2003 | Oates | 375/147 |
| 2004/0146024 A1 | * | 7/2004 | Li et al. | 370/334 |
| 2005/0003766 A1 | | 1/2005 | Chen | 455/67.11 |
| 2005/0036575 A1 | | 2/2005 | Kuchi et al. | 375/348 |
| 2005/0201493 A1 | | 9/2005 | Onggosanusi et al. | 375/340 |
| 2006/0109938 A1 | | 5/2006 | Challa et al. | 375/347 |
| 2006/0115079 A1 | | 6/2006 | Heiman et al. | 380/28 |
| 2006/0223479 A1 | * | 10/2006 | Stanners | 455/296 |
| 2007/0047587 A1 | * | 3/2007 | Kuo et al. | 370/497 |
| 2009/0016429 A1 | * | 1/2009 | Kokojima et al. | 375/240.01 |
| 2009/0027257 A1 | * | 1/2009 | Arikan et al. | 342/159 |

* cited by examiner

Primary Examiner — David C. Payne
Assistant Examiner — Erin M File
(74) Attorney, Agent, or Firm — Hamilton & Terrile, LLP; Gary W. Hamilton

(57) ABSTRACT

A system and method is disclosed for providing single antenna interference cancellation processing with minimum latency. Incoming data frames are processed to generate a plurality of parallel data streams which are then further processed using a parallel single antenna interference cancellation algorithm to reject the signals and to generate a data stream containing only the desired symbols. In various embodiments of the invention, the parallel data streams are processed using a parallel arithmetic logic unit that is capable of operating in single-cycle mode in response to a first control stream and a multi-cycle mode in response to a second control stream. Embodiments of the invention comprise a three port memory interface operable to receive the parallel data streams and to generate a virtual three-dimensional data structure therefrom. In some embodiments of the invention, the virtual three-dimensional data representation comprises a plurality of segmented matrices, with the segmented matrices comprising data corresponding to portions of the incoming data frames. Data elements within the individual segments of the virtual three dimensional data structure can be calculated using data elements contained in a predetermined row and predetermined column of a segment.

16 Claims, 10 Drawing Sheets

| TIME | Element (L=5) | R0 | R1 | R2 | R3 | R4 | m0 | m1 | m2 | m3 | m4 | Address | Memory Element |
|---|---|---|---|---|---|---|---|---|---|---|---|---|---|
| 0 | aloeStart-2 | 0 | | | | | | | | | | | |
| 1 | aloeStart-1 | | 1 | | | | | | | | | | |
| 2 | aloeStart+0 | | | 2 | | | | | | | | | |
| 3 | aloeStart+1 | | | | 3 | | | | | | | | |
| 4 | aloeStart+2 | | | | | 4 | | | | | | | |
| 5 | aloeStart+3 | 5 | | | | | 0 | 1 | 2 | 3 | 4 | 0 | 0 1 2 3 4 |
| 6 | aloeStart+4 | | 6 | | | | 1 | 2 | 3 | 4 | 0 | 1 | 1 2 3 4 5 |
| 7 | aloeStart+5 | | | 7 | | | 2 | 3 | 4 | 0 | 1 | 2 | 2 3 4 5 6 |
| 8 | aloeStart+6 | | | | 8 | | 3 | 4 | 0 | 1 | 2 | 3 | 3 4 5 6 7 |
| 9 | aloeStart+7 | | | | | 9 | 4 | 0 | 1 | 2 | 3 | 4 | 4 5 6 7 8 |
| 10 | aloeStart+8 | 10 | | | | | 0 | 1 | 2 | 3 | 4 | 5 | 5 6 7 8 9 |
| . | . | | | | | | . | . | . | . | . | . | . . |
| . | . | | | | | | . | . | . | . | . | . | . . |
| 151 | aloeStart+L+144 | 151 | | | | | 1 | 2 | 3 | 4 | 0 | 146 | 146 147 148 149 150 |
| 152 | aloeStart+L+145 | | 152 | | | | 2 | 3 | 4 | 0 | 1 | 147 | 147 148 149 150 151 |
| 153 | aloeStart+L+146 | | | 153 | | | 3 | 4 | 0 | 1 | 2 | 148 | 148 149 150 151 152 |
| 154 | aloeStart+L+147 | | | | 154 | | 4 | 0 | 1 | 2 | 3 | 149 | 149 150 151 152 153 |
| 155 | aloeStart+L+148 | | | | | 155 | 0 | 1 | 2 | 3 | 4 | 150 | 150 151 152 153 154 |
| | | | | | | | 1 | 2 | 3 | 4 | 0 | 151 | 151 152 153 154 155 |

Moving Window 602

*Figure 6*

PARALLEL PROCESSING FOR SINGLE ANTENNA INTERFERENCE CANCELLATION

BACKGROUND OF THE INVENTION

1. Field of the Invention

The present invention is directed in general to the field of information processing. In one aspect, the present invention relates to a system and method for canceling interference in single antenna systems used in space division multiple access systems.

2. Description of the Related Art

Wireless communication systems transmit and receive signals within a designated portion of the electromagnetic frequency spectrum. However, the capacity of the electromagnetic frequency spectrum is limited. Thus, there is a need to improve the efficiency of spectrum utilization as the demand for wireless communication systems continues to expand.

Increasingly dense network coverage causes base stations to generate increasingly high levels of co-channel interference within the network. The effects of co-channel interference can be reduced by applying a class of algorithms known as Single Antenna Interference Cancellation (SAIC). Unlike Multiple Input Multiple Output (MIMO) systems, SAIC algorithms do not require the presence of multiple antennas on the mobile unit or the base station to reduce co-channel effects.

SAIC algorithms create relatively high computational requirements under the constraint of low latency. This is particularly true when incorporating the often-overlooked requirements associated with synchronization. During SAIC synchronization, proper delay estimation typically requires iterative computations across multiple SAIC delay values to perform initial synchronization. Furthermore, it is necessary to compute matrix inverses based upon minimum mean-square error (MMSE) formulations of the SAIC calculations. In addition to computational demands, SAIC techniques also generally require large amounts of memory.

As will be understood by those of skill in the art, many subscriber units, such as handheld mobile phones, have limited available memory. In addition, such devices have significant limitations with regard to size and power consumption. Accordingly, there is a need for an improved system and method for providing SAIC calculations for such mobile devices.

BRIEF DESCRIPTION OF THE DRAWINGS

The present invention may be understood, and its numerous objects, features and advantages obtained, when the following detailed description of a preferred embodiment is considered in conjunction with the following drawings, in which:

FIG. 6 is an illustration of the storage pattern for data received and processed by SAIC processor of the invention.

Figure 1:
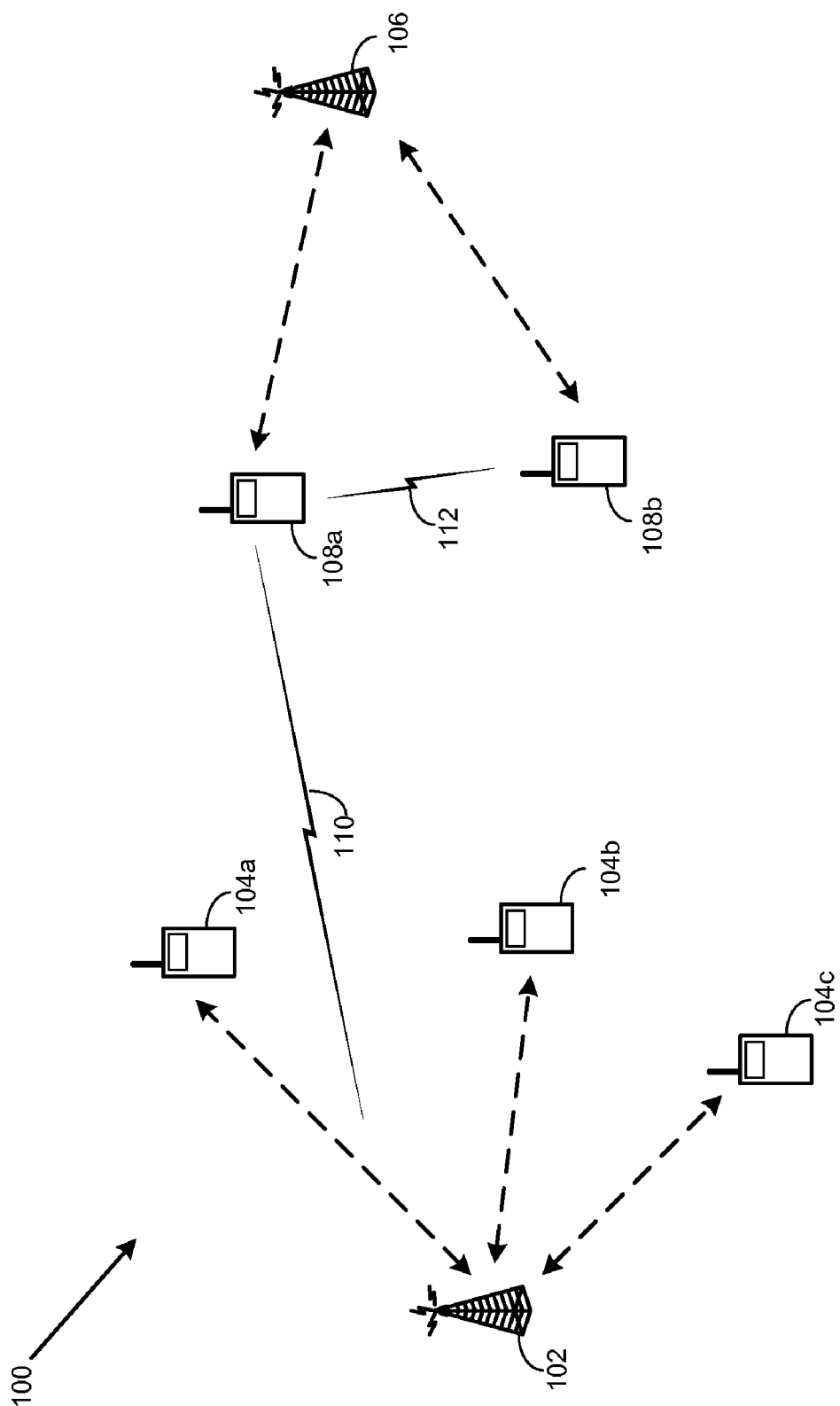
FIG. 1 illustrates a wireless communication system comprising base stations and a plurality of subscriber stations.

It will be appreciated that for simplicity and clarity of illustration, elements illustrated in the drawings have not necessarily been drawn to scale. Furthermore, where considered appropriate, reference numerals have been repeated among the drawings to represent corresponding or analogous elements.

DETAILED DESCRIPTION

Embodiments of the invention described herein provide a system and method for implementing a low power, high performance, SAIC processor having significantly less latency than previous approaches. Various embodiments of the invention are implemented using a parallel alternate linear output equalization (ALOE) process that makes it possible to perform end-to-end SAIC in fewer clock cycles than is need in prior art processors. In addition, various embodiments of the invention provide a system and method for generating a representation of a large virtual three-dimensional memory structure using a very small number of data elements stored in physical memory.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

FIG. 1 is a general illustration of an example of a wireless communication system 100 in which the present invention can be implemented. The wireless communication system 100 includes a base station 102 that communicates with subscriber stations 104a-c and a base station 106 that communicates with subscriber stations 108a-b. The subscriber stations 104a-c and 108a-b can be virtually any type of wireless one-way or two-way communication device such as a cellular telephone, wireless equipped computer system, or wireless personal digital assistant. As will be understood by those of skill in the art, the performance of heavily congested networks is limited by co-channel interference (CCI) from transmissions on a neighboring cell, illustrated generally by reference numeral 110 and/or by adjacent channel interference (ACI) from transmissions using adjacent frequencies in the same cell, illustrated by reference numeral 112. As discussed in greater detail hereinbelow, the present invention provides an improved system and method for performing SAIC to mitigate the effects of CCI and ACI.

The signals communicated between base station 102 and subscriber stations 104a-c can include voice, data, electronic mail, video, and other data, voice, and video signals. In operation, the base station 102 transmits a signal data stream over a channel H to subscriber stations 104a-c, which combine the received signal from one or more receive antennas 108 to reconstruct the transmitted data. To transmit the signal vector s, the base station 102 prepares a transmission signal, represented by the vector x, for the signal s. In the discussion hereinbelow, lower case "boldface" variables indicate vectors and upper case "boldface" variables indicate matrices. The transmission signal vector x is transmitted via a channel represented by a channel matrix H, and is received at the subscriber stations 104a-c as a receive signal vector y=Hx+n (where n represents co-channel interference or noise). The channel matrix H represents a channel gain between the transmitter antenna and the subscriber station antenna. The coefficients of the channel matrix H depend, at least in part, on the transmission characteristics of the medium, such as air, through which a signal is transmitted. A variety of methods may be used at the receiver to determine the channel matrix H coefficients, such as transmitting a known pilot signal to a receiver so that the receiver, knowing the pilot signal, can estimate the coefficients of the channel matrix H using well-known pilot estimation techniques. Alternatively, when the channel between the transmitter and receiver are reciprocal in both directions, the actual channel matrix H is known to the receiver and may also be known to the transmitter. For SAIC calculations, it is important to obtain an estimation of the delay of the various symbols comprising the received signal vector y.

Figure 2:
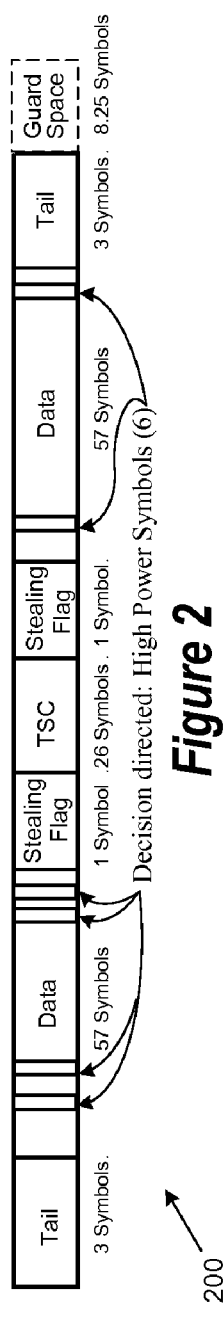
FIG. 2 is an illustration of a typical GSM data frame.

FIG. 2 is an illustration of a typical GSM data frame 200, comprising: a guard space (8.25 symbols), first and second "tails" (3 symbols each), first and second data segments (57 symbols each), first and second stealing flags (1 symbol each), a training sequence code segment (26 symbols) and six high-power symbols. The functions of the various segments of the GSM frame 200 are well understood by those of skill in the art and, therefore, are not discussed herein. The processing of the tail segments and training sequence code segment will, however, be discussed in greater detail below in connection with the improved SAIC techniques of the present invention.

Figure 3:
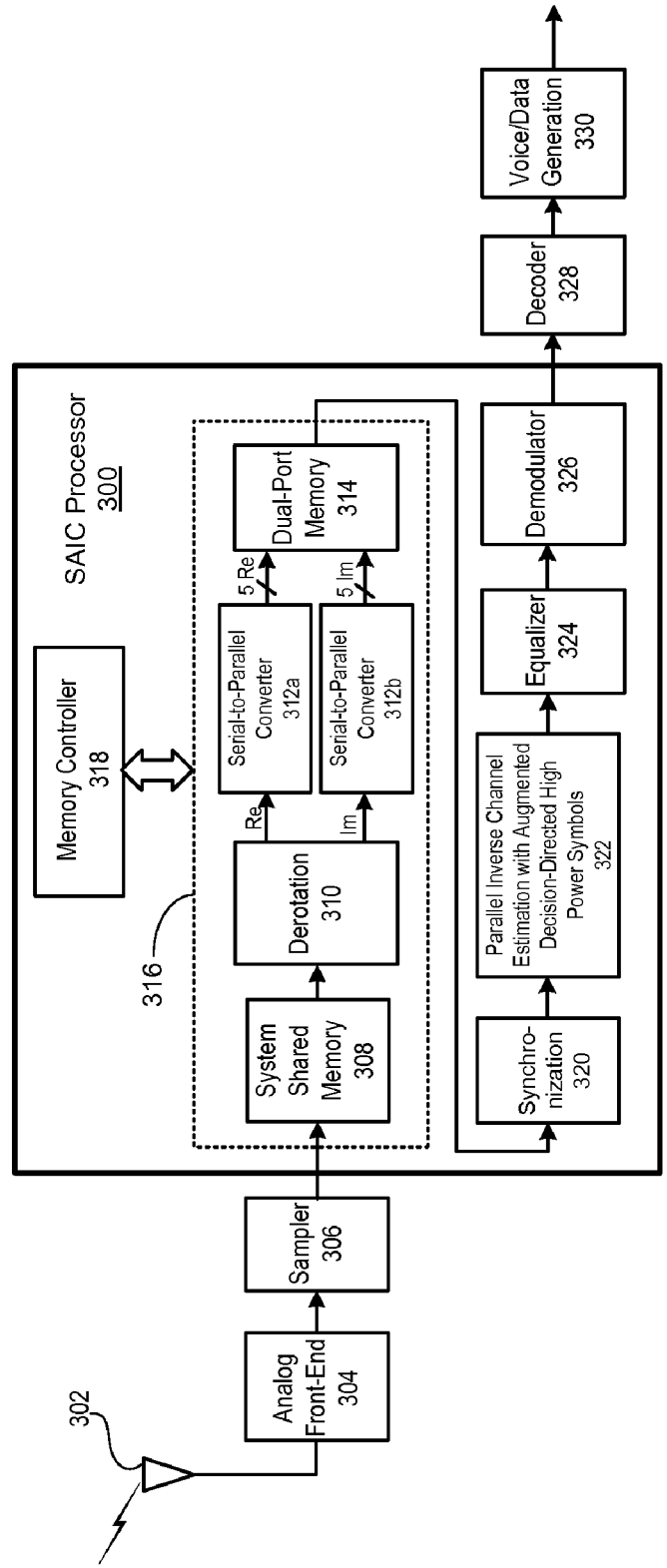
FIG. 3 is a block diagram of components of one of the subscriber stations shown in FIG. 1.

FIG. 3 is a block diagram of the functional components of a subscriber station, such as subscriber stations 104a-c shown in FIG. 1, comprising an SAIC processor 300 in accordance with embodiments of the present invention. The various embodiments of the invention will be discussed primarily with regard to receiving incoming communication signals and, therefore, only the receiving circuitry is illustrated.

Antenna 302 receives GSM frames from the transmitting base station, including undesired versions of the signals. The received signals are processed by the analog front-end 304, using GSM techniques known in the art, to convert the RF signals into lower frequency digital or baseband signals for further processing. The signals generated by the analog front end 304 provided to the sampler 306 that samples the incoming signal at a rate Q, that is twice the symbol rate, to generate a discrete-time output representation of the symbols. The output of the sampler 306 is provided as an input to a system shared memory 308 that accumulates and aggregates symbol data. The symbol data comprises both real and imaginary components.

As will be understood by those of skill in the art, GSM systems use Gaussian Minimum Shift Keying ("GMSK"), which includes a 90 degree rotation and 1 bit per symbol in its modulation. The output of the shared system memory is, therefore, provided to a derotation module 310 that multiplies each sample by a rotation matrix to apply derotation to the discrete time sequence. The real and imaginary components of the derotated symbols are provided to serial-to-parallel converters 312a and 312b, respectively. The serial-to-parallel converters 312a and 312b are operable to generate a parallel stream of real and imaginary data that is stored in dual-port memory 314. In an embodiment of the invention, the parallel data streams have a degree of parallelism equal to "five." As will be discussed in greater detail below, aforementioned components for processing the sampled data provide a three-port memory interface 316 that is controlled by a memory controller 318. The three port memory interface 316 is operable to use shared system memory 308 and dual-port memory 314 to store the incoming GSM signal data in a virtual three-dimensional data structure, as discussed below.

A synchronization module 320 is operable to process the data streams to provide a delay estimation by performing iterative computations across multiple SAIC delay values. The parallel inverse channel estimation module 322 comprises processing logic operable to implement an SAIC algorithm discussed in greater detail hereinbelow. In various embodiments of the invention, the channel estimation can be implemented using a known training sequence code ("TSC") techniques, discussed hereinbelow. The output of channel estimation module 322 is provided to an equalizer 324, that may be a maximum likelihood sequence estimator ("MLSE") equalizer, or other type of estimator known to those of skill in the art. The equalizer 324 generates a "soft" decision for each symbol, which is a prediction of the value that each symbol is believed to represent. Each symbol is subsequently decoded into a final value of −1 or +1, which is referred to as a hard decision.

The output of the equalizer 324 is provided to a demodulator module 326 that is operable to process the data streams to recover transmitted symbols. Decoder 328 is operable to implement Viterbi decoding, or other appropriate decoding schemes, to produce a hard decision output. The output of the decoder 328 is then provided as an input to the voice/data generation module 330 to generate voice or data from the received GSM signal.

Figure 4:
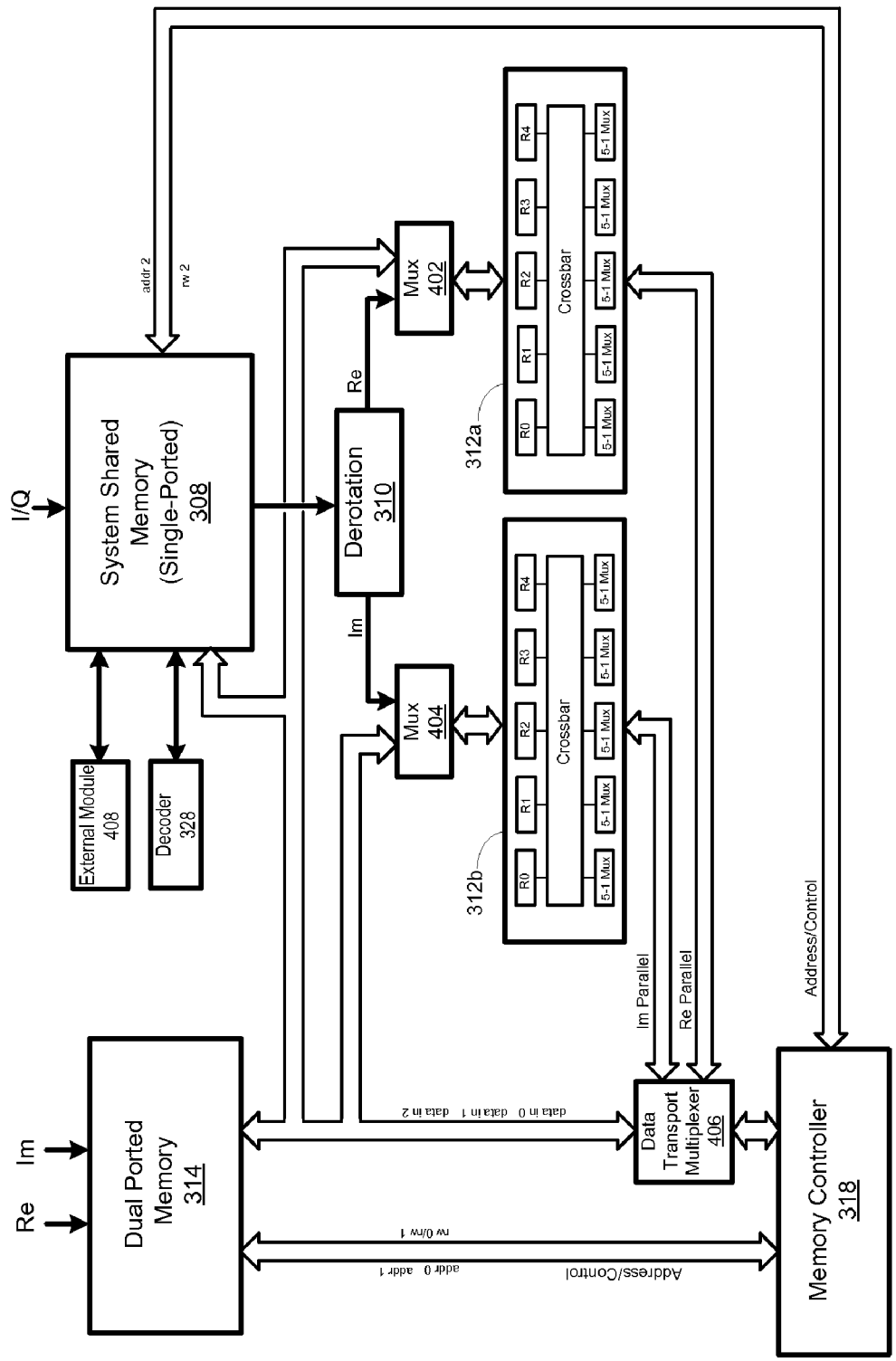
FIG. 4 is an illustration of the three-port memory interface used in embodiments of the invention.

FIG. 4 is an illustration of the functional components of the three-port memory interface 316 shown in FIG. 3. Embodiments of the invention are operable to use the three-port memory interface 316 to provide on-the-fly derotation of the GSM frame during I/Q data fetches from system memory to dual-port memory. Incoming complex I/Q data is received in the system shared memory 308, and is then derotated in derotation module 310 to generate derotated real and imaginary components of the data symbols. The real and imaginary component are provided to multiplexers 402 and 404, respectively, that control the flow of data into the serial-to-parallel converters 312 and 312b, respectively. The serial-to-parallel converters 312a and 312b each include an "n-mod-5" multiplexer bank comprising a plurality of 5-1 multiplexers that are connected via a crossbar switch to a plurality of data input registers. The memory controller 318 controls a data transport multiplexer 406 this is operable to manage the transfer of data from the serial-to-parallel converters 312a and 312b to the dual-ported memory 314 and single-ported system shared memory 308. The memory controller 318 is also operable to transfer data from the system shared memory 308 to modules outside of the SAIC processor, such as the decoder 328 or other external processing modules 408. The three-port memory system shown in FIG. 4 is operable to convert between the memory footprints of IQ system memory (32 bits) and dual-port scratch memory (96 bits).

Figure 5:
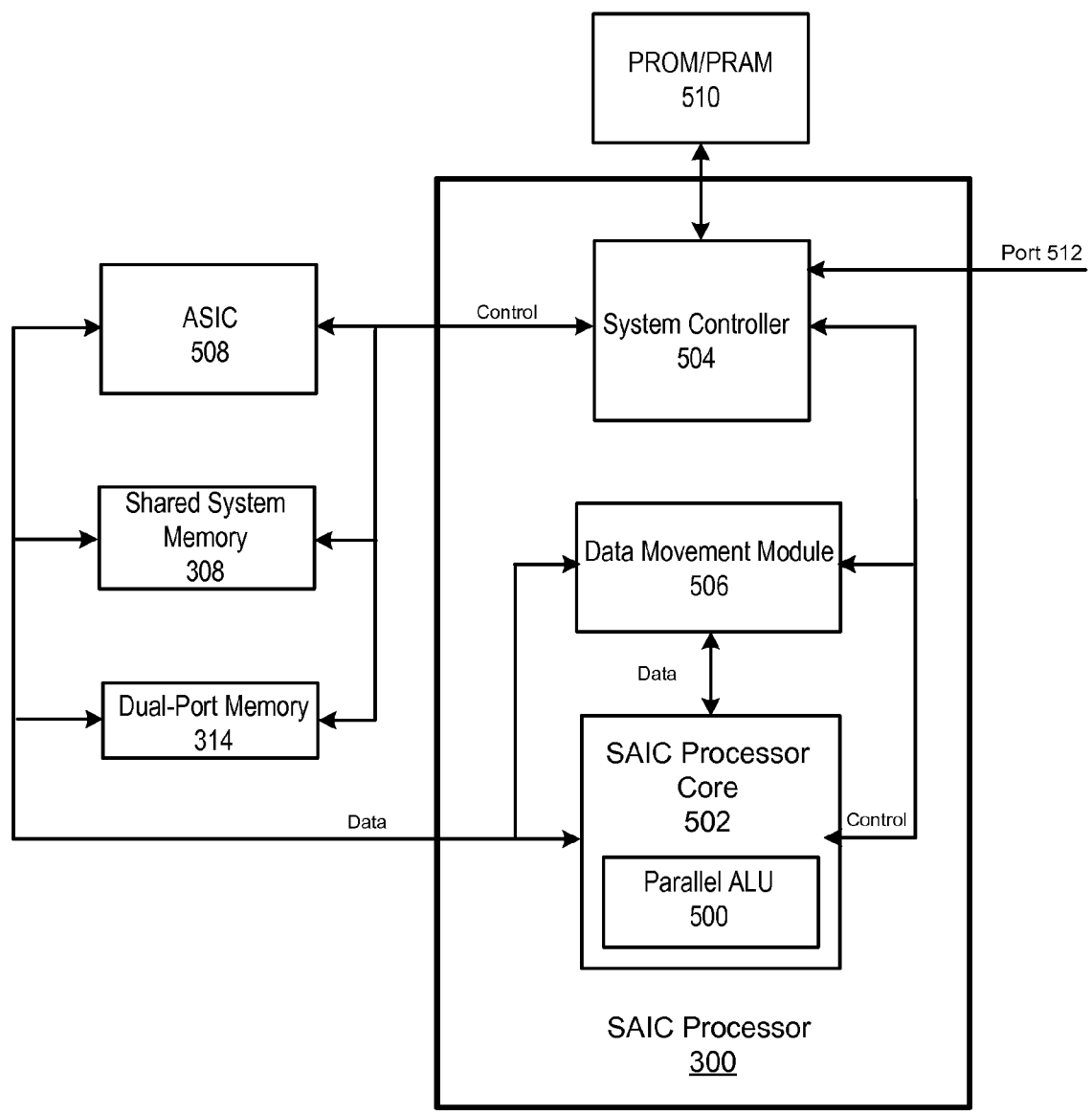
FIG. 5 is an illustration of an implementation of a parallel ALU used in various embodiments of the invention.

Various embodiments of the invention are implemented with a parallel ALU 500, shown in FIG. 5, in the core 502 of the SAIC processor 300. The parallel ALU is operable to use a control stream that can be generated by a plurality of sources. The system controller 504 provides a control engine that is operable to control operation of the system shared memory 308, the dual-port memory 314, the data movement module 506, various application-specific integrated circuits (ASICs) 508 and the parallel ALU 500. In some embodiments of the invention, the control instructions are stored in a PROM/PRAM module 510. In other embodiments of the invention, the control instructions are provided by external modules via a port 512.

The control stream generated by the system controller 504 is operable to cause the parallel ALU to operate in first or second operating modes depending on the source of the control instructions. The first operating mode is a standard operating mode, wherein the control stream comprises standard program memory instructions for single-cycle parallel ALU operation. In the standard mode, the parallel ALU 500 has access to standard control decoding mechanisms. The second mode is an alternate operating mode, wherein the control stream comprises special program memory instructions for multi-cycle parallel ALU operation. In the alternate mode, the special instructions are used to generate an alternate micro-control stream program that is of arbitrary length and is operable to run to completion. When operating in the second mode, the parallel ALU 500 has access to all control states and registers of the SAIC processor 300, thereby enabling the micro-control stream to have as wide a program size as necessary for the particular parallel multi-cycle instruction. The special instructions allow the parallel ALU 500 to service special processing requests from an ASIC 508 or other system module. In addition, the alternate operating mode is extensible and can support special processing needs from peripheral modules via a port 512 to the system controller 504.

FIG. 6 is an illustration of a storage sequence implemented by the three-port memory interface 316 of FIG. 4, whereby incoming data is stored in a predetermined sequence to provide memory redundancy. The serial-to-parallel converters 312a and 312b of the three port memory interface 316 provide a parallel data stream that allows incoming data to be stored using a moving window 602 of five incoming samples that are sequentially stored in registers $R_0$-$R_4$ as shown in FIG. 4, so that at time t=4, each of the registers $R_0$-R contains data elements "0," "1," "2," "3" and "4." At time t=5, the memory elements "0," "1," "2," "3" and "4" are stored at address 0, and register $R_0$ is overwritten with memory element "5." At time t=6, register $R_1$ is overwritten with memory element "6" and the memory elements at address 1 are shifted left to remove memory element "0," and memory element "5" is added, etc. The memory structure shown in FIG. 6 has a redundancy and symmetry that can be used to provide memory-efficient, virtual three-dimensional data structures of the GSM delayed frame that enable delayed offset correlation over the non-contiguous GSM frame.

Figure 7:
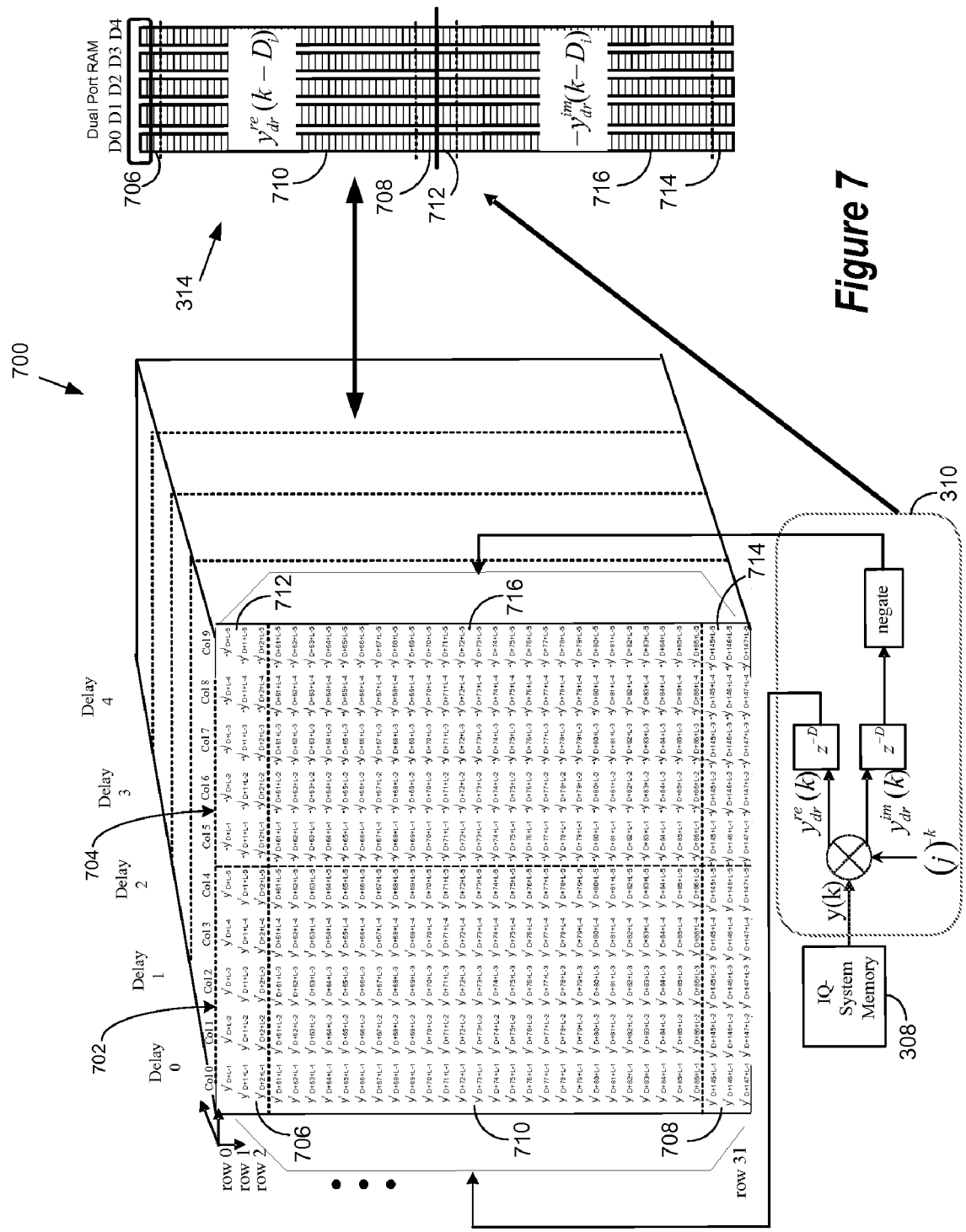
FIG. 7 is an illustration of a virtual three-dimensional data structure implemented in an embodiment of the present invention.

FIG. 7 is an illustration of a virtual three-dimensional data structure 700 implemented in embodiments of the invention using the three-port memory interface 316 described hereinabove. A data stream y(k) provided by IQ system memory 308 is processed by derotation module 310 to produce "one-the-fly" derotated real and imaginary y(k) data streams to generate the virtual three-dimensional data structure 700. The output of the derotation module 310 is physically provided to dual-port memory 314, and the real and imaginary derotated y(k) data values corresponding to different delays are stored as vectors in a plurality of one-dimensional columns in the dual port memory 314. The "on-the-fly" derotation of the incoming y(k) data stream converts the I/Q system memory to a parallel dual-port format at different delays. The virtual three-dimensional data structure 700 is generated from the data stored in the dual-port memory 314 by microcode instructions that enable the SAIC core processor memory controller 318, shown in FIG. 3, to perform direct shared RAM to dual-port data communication. In an embodiment of the invention, the virtual three-dimensional data structure 700 is comprised of y(k) elements organized in a plurality of matrices of 32 rows and 10 columns with 5 delays, for a total of 1600 y(k) elements.

FIG. 7 shows the matrix for Delay 0, comprising five columns of real data elements, denoted by reference numeral 702, and five columns of imaginary data, denoted by reference numeral 704. As will be discussed below, the segments in the virtual three-dimensional data structure 700 comprise a plurality of segments corresponding to data in a GSM burst. Segments 706 and 708 comprise derotated real data elements corresponding to tail segments of a GSM burst. Segment 710 comprises real data elements corresponding to the training sequence code (TSC) segment of a GSM burst. Likewise, segments 712 and 714 comprise derotated imaginary data elements corresponding to tail segments of a GSM burst. Segment 716 comprises imaginary data elements corresponding to the training sequence code (TSC) segment of a GSM burst.

As will be discussed below, in various embodiments of the invention data elements of the virtual three dimensional data structure can be generated by using a comparatively small number of data elements physically stored in the dual port memory 314. For example, a virtual three-dimensional data structure comprising 1600 data elements maps to a one-dimensional vector of 88 physically stored elements in the dual port memory 314.

Figure 8:
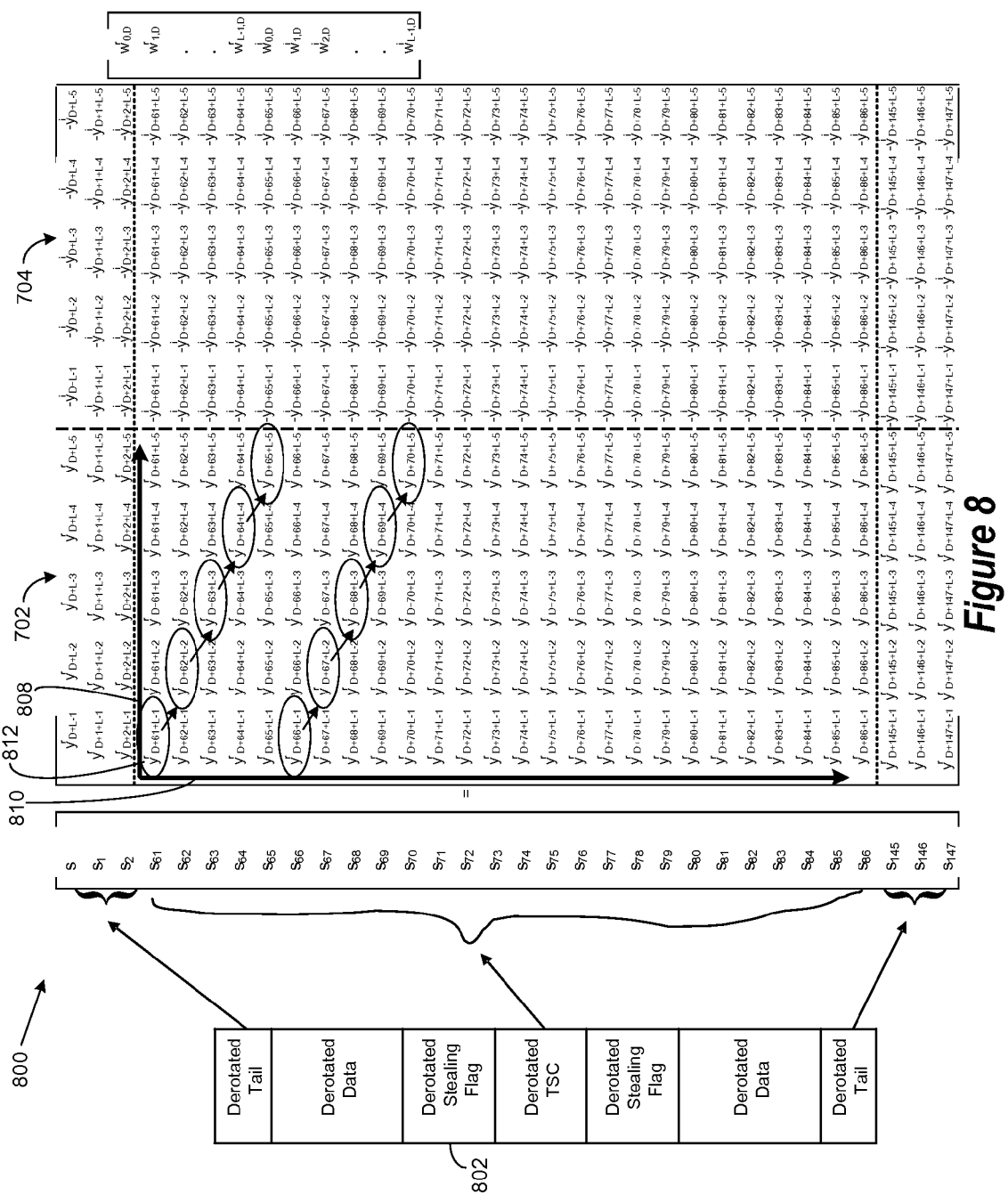
FIG. 8 shows details of one of the matrices in the virtual three-dimensional data structure shown in FIG. 7.

FIG. 8 shows details of one matrix 800 of the plurality of 32 row-10 column matrices in the virtual three-dimensional data structure 700 discussed above in connection with FIG. 7. The data stored in the matrix 800 comprises data corresponding to portions of a GSM burst 802. As will be understood by those of skill in the art, a GSM data frame comprises two "tail" segments, two user data segments, two stealing flag segments, and a TSC segment. In some embodiments of the present invention, the virtual three-dimensional data structure is only used to store data corresponding to the tail segments and the TSC segment of the GSM burst. In other embodiments of the invention, the virtual three-dimensional data structure is used to store data corresponding to the entire GSM burst. The individual matrices of the virtual three-dimensional data structure are organized with five columns of data corresponding to the real data samples, denoted by reference numeral 702, and five columns of data corresponding to the imaginary data samples, denoted by reference numeral 704. The rows of the matrix are segmented with the first three rows and last three rows of the real and imaginary columns containing symbol data for the derotated tails. The intermediate segment comprises 26 rows of symbol data to provide real and imaginary derotated TSC data.

The segmented virtual matrix data structure shown in FIG. 8 comprises a data element redundancy that allows efficient generation of data elements in the interior of each segment by using the data elements in a single row and column and calculating offset values corresponding to the desired data element. For example, interior data elements of the real TSC segment of the virtual matrix 800 can be calculated using data elements in the top row 808 and the leftmost column 810 of the TSC real data segment. This result can be seen by comparing the diagonal orientation of data elements, illustrated by reference numeral 812, in the TSC segment. The value of element $y^r_{D+61+L-1}$ will be the same as the values for $y^r_{D+62+L-2}$, $y^r_{D+63+L-3}$, $y^r_{D+64+L-4}$, and $y^r_{D+65+L-5}$. A similar symmetry exists to correlate each of the interior data elements along diagonals of the matrix 800 with corresponding data elements on the top row or leftmost column or each segment.

The matrix 800 contains symbol data corresponding to the delay D0. Similar matrices (not shown) are generated for delay offsets D1-D4. It will be apparent to those of skill in the art that the value of individual data elements in the interior of each segment of the matrix 800, the other matrices, can be obtained by calculating only the relative offset of the desired data element with respect to a predetermined data element in the top row or leftmost column of a matrix segment.

Figure 9:
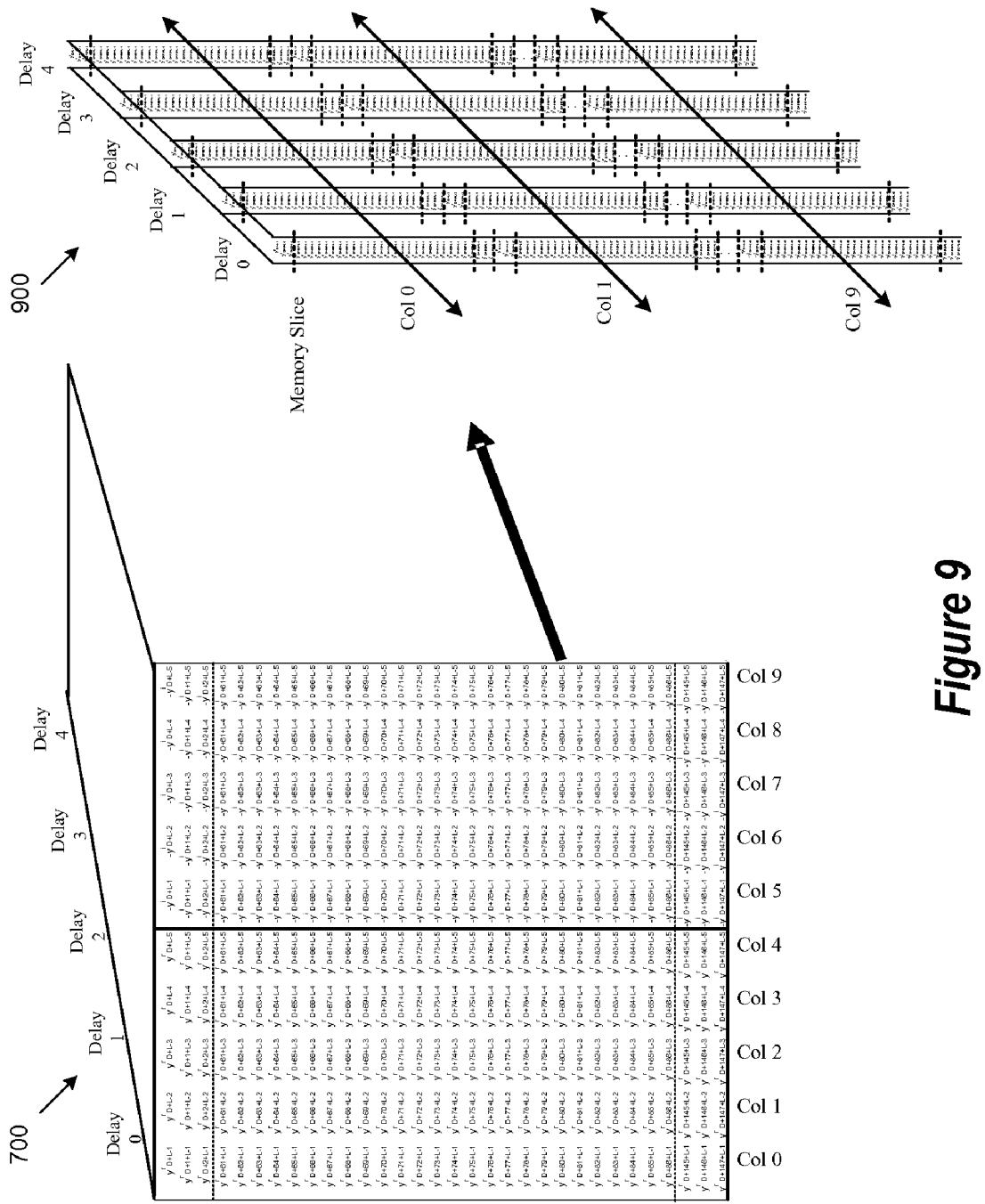
FIG. 9 is an illustration of a memory slice of data corresponding to a portion of the data stored in the virtual three-dimensional data structure shown in FIG. 7.

FIG. 9 illustrates a memory slice 900 obtained from the virtual three dimensional data matrix 700 shown in FIG. 7. The memory slice 900 comprises a plurality of columns, col 0, col 1 and col 9. In embodiments of the invention, the data in column 0 is actually stored, while the data contained in col 1 and col 9 are obtained by calculating the relative offset of the desired data element with respect to a predetermined data element in the top row of the left most column of a matrix segment.

Figure 10:
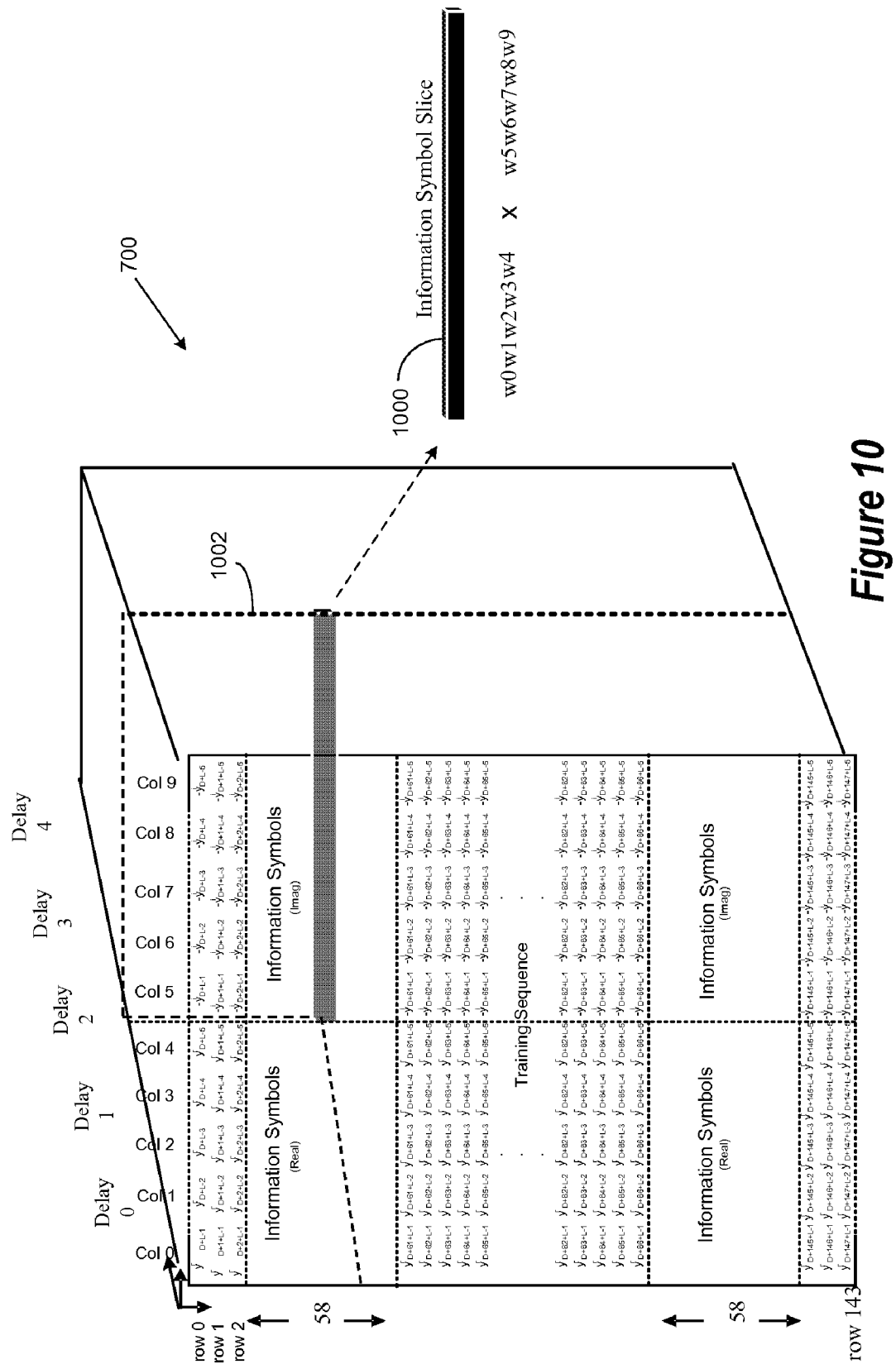
FIG. 10 is an illustration of an information symbol slice generated from data stored in the virtual three-dimensional data structure shown in FIG. 7.

FIG. 10 is an illustration of a symbol data slice 1000 obtained from the virtual three-dimensional matrix 700 shown in FIG. 7. The information slice 1000 comprises the MMSE weight coefficients w0-w9 obtained from a row of an interior data matrix 1002 in the interior of the virtual three-dimensional data matrix 700.

Figure 11:
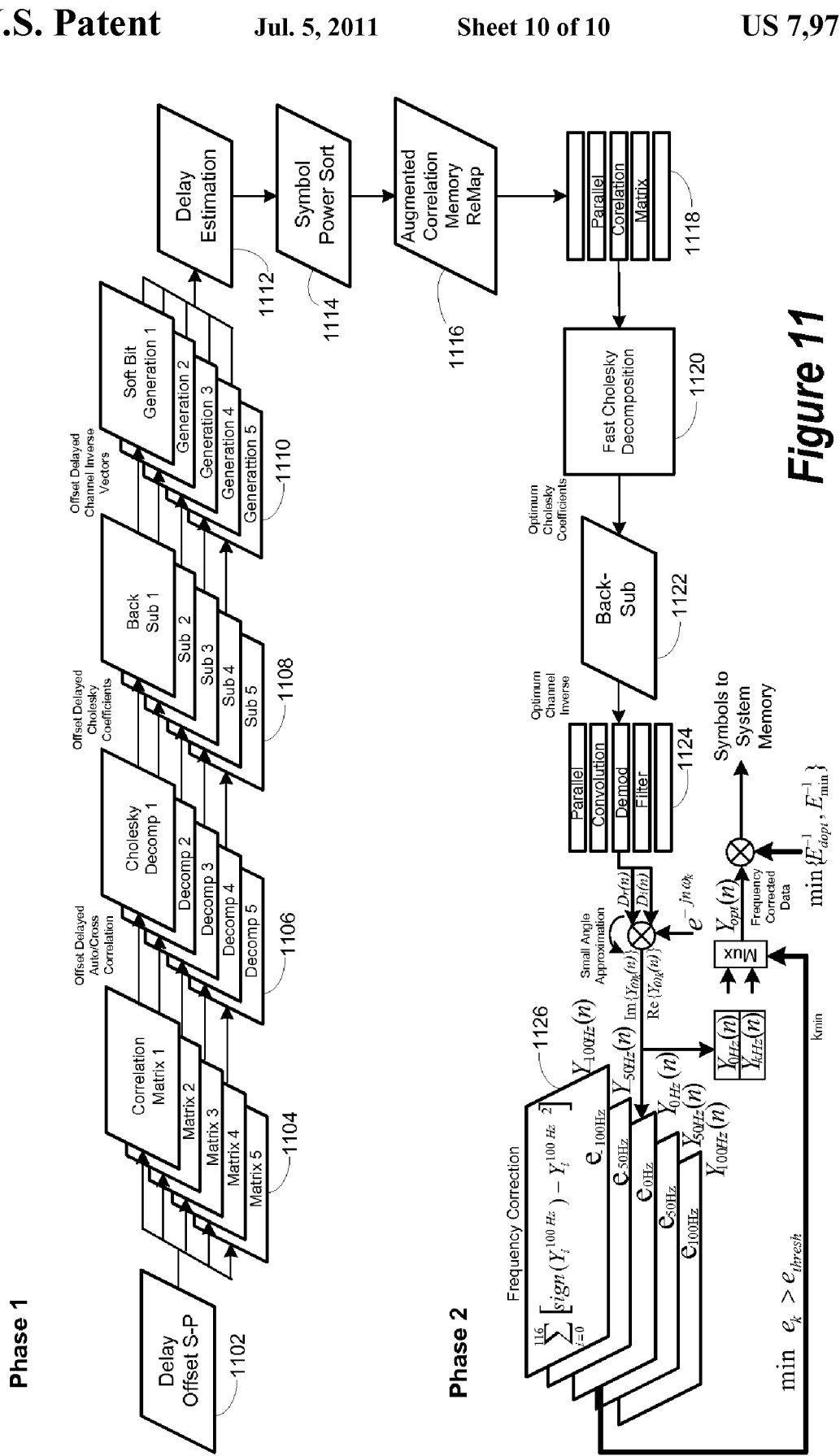
FIG. 11 is a flowchart illustration of processing steps implemented in the parallel SAIC-ALOE algorithm provided by various embodiments of the present invention.

FIG. 11 is a flowchart illustration of processing steps implemented in the improved SAIC-ALOE algorithm provided by various embodiments of the present invention. The processing shown in FIG. 11 comprises two phases: 1) delay estimation; and 2) generation of symbols for transfer to system memory. In step 1102, data elements in five parallel streams from the three-port memory interface are generated and, in step 1104, are processed by the SAIC processor to calculate parallel correlation and cross correlation of the data elements in the delay dimension. In step 1106, a parallel Cholesky decomposition is performed to generate offset-delayed Cholesky coefficients. In step 1108, a parallel back substitution is performed to generate MMSE Weight ($W_d$) coefficients and offset delayed channel inverse vectors. The processing steps described for steps 1104-1108 are performed using the following formula:

$$W^d_{opt} = [R^d_{ij}]^{-1}_{10,10} r^d_j{}_{10} = \left[ [Y^d_{re} | -Y^d_{im}]^H_{10,32} [Y^d_{re} | -Y^d_{im}]_{32,10} \right]^{-1} \left[ Y^d_{re} \left| \begin{matrix} r^d_j \\ -Y^d_{im} \end{matrix} \right._{10,32} \right]^H \bar{T}_{sc}{}_{32}$$

In step 1110, parallel convolution is performed (training sequence estimate) of $W_d$ with d rotated input data to provide a soft bit estimate. In step 1112, an optimal delay estimation is generated using the formula:

$$E^d = \bar{T}_{sc}{}_{26} - \hat{T}_{sc}{}_{26}$$
$$= \bar{T}_{sc}{}_{26} - [Y^d_{re} | -Y^d_{im}]_{26,10} W^d$$

Where the optimum delay is given by the formula:

$$d_{opt} = \min_d \{E^d\} \begin{matrix} \Rightarrow W^{dopt} \\ \Rightarrow E^{dopt} \end{matrix}$$

In step 1114, a symbol power sort is conducted to generate a high power soft bit estimate. In step 1116, the soft bit estimates are processed to generate an argument-correlation memory remap and the processed data is then loaded into a parallel correlation matrix in step 1118. The data is then processed using a fast Cholesky decomposition in step 1120 to generate optimum Cholesky coefficients. In step 1122, a back substitution is performed, thereby generating an optimal channel inverse $w^{aug}(n)$ which is provided to a parallel convolution demodulation filter in step 1124. The output of the parallel convolution demodulation results in complex soft bit generation comprising real and imaginary soft bit components. In step 1126, the complex soft bits are processed using convolutional calculation techniques are perform then used to generate frequency-corrected symbols which are then transferred to system memory.

As will be appreciated by those of skill in the art, the system and method disclosed herein provides single antenna interference cancellation processing with significantly lower latency than previous approaches. In the various embodiments of the invention as described herein, a system and method has been disclosed for processing a plurality of incoming data frames, wherein said data frames comprise desired symbols and undesired symbols. The incoming data frames are processed to generate a plurality of parallel data streams which are then further processed using a parallel, single antenna interference cancellation algorithm to reject the undesired signals and to generate a data stream containing only the desired symbols. In various embodiments of the invention, the parallel data streams are processed using a parallel arithmetic logic unit. Various embodiments of the invention comprise a three port memory interface operable to receive the parallel data streams and to generate a virtual three-dimensional data structure therefrom. In some embodiments of the invention, the virtual three-dimensional data representation comprises a plurality of segmented matrices, with the segmented matrices comprising data corresponding to portions of the incoming data frames. In some embodiments, the plurality of data segments comprise derotated training sequence data. Data elements within the individual segments of the virtual three dimensional data structure can be calculated using data elements contained in a predetermined row and predetermined column of a segment. The desired data elements not located on the predetermined row or the predetermined column can be calculated using a relative offset of the desired data element with respect to a predetermined data element located on the predetermined row or predetermined column of the segment.

Those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module. The computer-based data processing system described above is for purposes of example only, and may be implemented in any type of computer system or programming or processing environment, or in a computer program, alone or in conjunction with hardware. In addition, some portions of the description provided herein are presented in terms of algorithms or operations on data within a computer memory. As noted herein, such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. In description of the embodiments disclosed herein, discussion using terms such as processing, computing, assessing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of canceling interference in a data communication system, comprising:
   receiving a plurality of incoming data frames, said data frames comprising desired data and undesired interference;
   using a processor to process said data frames to generate a plurality of parallel data streams; and
   using said processor to process said parallel data streams using a parallel single-antenna interference cancellation algorithm, to reject said undesired interference and to generate a data stream containing said desired data;
   using said processor to process said parallel data streams to generate a virtual three-dimensional data representation of data comprising said incoming data frames;
   wherein said virtual three-dimensional data representation comprises a plurality of segmented matrices, said segmented matrices comprising data corresponding to segments of said incoming data frames; and
   wherein each of said segmented matrices comprise physically stored data for data elements defining one predetermined row and one predetermined column thereof.

2. The method of claim 1, wherein said parallel data streams are processed using a parallel arithmetic logic unit.

3. The method of claim 1, wherein said parallel arithmetic logic unit is operable to perform single-cycle arithmetic operations in response to a first control stream and to perform multi-cycle arithmetic operations in response to a second control stream.

4. The method of claim 1, wherein said parallel data streams are processed using a three port memory interface.

5. The method of claim 4, wherein the three port memory interface comprises single-port shared system memory and dual-port memory.

6. The method of claim 1, wherein at least one dimension of said virtual three-dimensional data representation corresponds to delay parameters associated with said incoming data frames.

7. The method of claim 1, wherein said plurality of segments comprises derotated training sequence (TSC) data.

8. The method of claim 1, wherein a desired data element not located on said predetermined row or predetermined column is calculated using a relative offset of said desired data element with respect to a data element located on said predetermined row or predetermined column.

9. A system for canceling interference in data communications, comprising:
   a receiver module operable to receive a plurality of incoming data frames, said data frames comprising desired data and undesired interference;
   a processor operable to process said incoming data frames to generate a plurality of parallel data streams, to store data elements comprising said parallel data streams, to implement a parallel single-antenna interference cancellation algorithm to eliminate said undesired interference, and to generate a data stream containing said desired data; and to process said parallel data streams to generate a virtual three-dimensional data representation of data comprising said incoming data frames;
   wherein said virtual three-dimensional data representation comprises a plurality of segmented matrices, said segmented matrices comprising data corresponding to segments of said incoming data frames; and
   wherein each of said segmented matrices comprise physically stored data for data elements defining one predetermined row and one predetermined column thereof.

10. The system according to claim 9, wherein said parallel data streams are processed using a parallel arithmetic logic unit.

11. The system according to claim 10, wherein said parallel arithmetic logic unit is operable to perform single-cycle arithmetic operations in response to a first control stream and to perform multi-cycle arithmetic operations in response to a second control stream.

12. The system of claim 9, wherein said memory logic comprises a three port memory interface.

13. The system of claim 12, wherein said three port memory interface comprises single-port shared system memory and dual-port memory.

14. The system of claim 13, wherein at least one dimension of said virtual three-dimensional data representation corresponds to delay parameters associated with said incoming data frames.

15. The system of claim 13, wherein said plurality of segments comprises derotated training sequence (TSC) data.

16. The system of claim 9, wherein a desired data element not located on said predetermined row or predetermined column is calculated using a relative offset of said desired data element with respect to a data element located on said predetermined row or predetermined column.

* * * * *